United States Patent [19]

Yamaguchi

[11] Patent Number: 5,005,862
[45] Date of Patent: Apr. 9, 1991

[54] TILTABLE STEERING DEVICE

[75] Inventor: Mikio Yamaguchi, Takasaki, Japan

[73] Assignee: Nippon Seiko Kabushiki Kaisha, Tokyo, Japan

[21] Appl. No.: 546,944

[22] Filed: Jul. 2, 1990

[30] Foreign Application Priority Data

Jul. 7, 1989 [JP] Japan ................................. 1-174063

[51] Int. Cl.$^5$ .............................................. B62D 1/18
[52] U.S. Cl. ..................... 280/775; 74/540; 74/493
[58] Field of Search .................. 280/775; 74/493, 540, 74/541

[56] References Cited

U.S. PATENT DOCUMENTS 4,594,909  6/1986  Yamaguchi ........................ 280/775

FOREIGN PATENT DOCUMENTS 0139295   5/1985  European Pat. Off. .............. 74/493
3621042   1/1987  Fed. Rep. of Germany ........ 74/493
60-128076 7/1985  Japan ................................... 74/493

Primary Examiner—Richard A. Bertsch
Assistant Examiner—Karin Tyson
Attorney, Agent, or Firm—Shapiro and Shapiro

[57] ABSTRACT

A tiltable steering device comprises a support bracket fixed to a vehicle body, a steering column having one end pivotally secured to the support bracket by means of first horizontal shafts, a first engaging member fixed to the underside of the steering column and having a lower surface projecting downward in an arcuate form centered at the axis of the first horizontal shafts and having first engaging teeth formed on the downwardly projecting lower surface thereof, a second engaging member pivotally supported at its one end on a second horizontal shaft provided on the support bracket and provided with second engaging teeth provided on the upper edge of the other end thereof and engageable with the first engaging teeth; and a hanger plate rockable to cause the first and second engaging teeth to be brought into and out of engagement with each other and having a slot formed in one end thereof. The other end of the second engaging member and an intermediate portion of the hanger plate are pivotally supported by a third horizontal shaft, and a guide member projecting from one side of the support bracket is loosely received in the slot formed in the hanger plate, the slot having a form which does not conform with an arc centered at the third horizontal shaft.

4 Claims, 4 Drawing Sheets

TILTABLE STEERING DEVICE

BACKGROUND OF THE INVENTION

1. Field of the Invention

The present invention relates to a tiltable steering device and, more particularly, to an improvement in a structure for pivotably supporting the steering column of a steering device of a vehicle, for the purpose of attaining a compact construction of a tilt adjusting portion of the structure.

2. Related Background Art

A device called tiltable steering device has been known which enables adjustment of height of the steering wheel in accordance with the size of the body of the driver or the position of the driver.

An example of such a tiltable steering device is disclosed in, for example, Japanese Utility Model Application Laid-Open No. 60-144569.

This known tiltable steering device is of a type which is generally referred to as neck swinging type. In this known tiltable steering device, as shown in FIG. 4, a steering column 2 through which a steering shaft extends is divided into two parts: namely, a lower steering column section 3 and an upper steering column section 4, wherein both column sections are coupled to each other by means of a support bracket 5 on the body. The upper steering column section 4 is supported for pivoting motion about an axis provided by horizontal shafts 6, 6 which are provided on both sides of the support bracket 5 as shown in FIGS. 5 to 7.

A connecting mechanism, which is engageable and disengageable by the operation of a tilt lever 7 pivotable about the axis of the horizontal shafts 6, 6, is provided between the support bracket 5 and the upper steering column section 4, the connecting mechanism being switchable between two states: namely, a state in which it connects the upper steering column section 4 and the support bracket 5, i.e., the upper steering column section is fixed against pivoting motion, and a state in which it allows the upper steering column section 4 to move relative to the support bracket 5, i.e., the upper steering column section 4 is allowed to pivot.

Thus, in this tiltable steering device, the upper steering column section 4 is pivotably connected at its one end to the support bracket 5 by means of the horizontal shafts 6, 6 provided on the support bracket 5 which is fixed to the body, e.g., at the underside of the dash board 8. In addition, a first engaging member 9 is fixed to the underside of the upper steering column section 4. The lower surface of the first engaging member 9 is projected along an arc centered at the axis of the horizontal shafts 6, 6. First engaging teeth 10 are provided on the projected underside of the first engaging member 9.

Another horizontal shaft 11 provided on the support bracket 5 pivotably supports one end (left end as viewed in FIGS. 5 and 7) of the second engaging member 12 which is selectively engageable with the first engaging member 9. Second engaging teeth 13 for engagement with the first engaging teeth 10 on the underside of the first engaging portion 9 are formed on the upper end edge (right upper end edge as viewed in FIG. 5) of the second engaging member 12. A shaft 14 connects both lower ends of the tilt lever 7 which is pivotably supported by the horizontal shafts 6, 6 at midst of two leg portions thereof. The shaft 14 carries a roller 15 the upper end of which is held in contact with the underside of the second engaging member 12.

A pin 18 projecting from one lateral side of the second engaging member 12 engages with an inclined slot 17 which is formed in a plate 16 fixed to the tilt lever 7.

According to this arrangement, as the tilt lever pivots counter-clockwise as viewed in FIG. 5, the roller 5 is retracted from the other end (right end as viewed in FIG. 5) of the second engaging member 12 and, at the same time, the other end of the second engaging member 12 is moved downward due to engagement between the inclined slot 17 and the pin 18.

Consequently, the second engaging teeth 13 provided on the upper face of the other end of the second engaging member 12 are disengaged from the first engaging teeth 10 provided on the underside of the first engaging member 9 fixed to the underside of the upper steering column section 4, so that the upper steering column section 4 is allowed to pivot about the axis of the horizontal shafts 6, 6 within a range corresponding to the range of movement of the pin 19 limited by the length of the arcuate slot 20 formed in the support bracket 20, thus enabling an adjustment of the height of a steering wheel fixed to the end of the steering shaft 1 which extends through the upper steering column section 4.

After the adjustment of height of the steering wheel, the driver swings the tilt lever 7 clockwise as viewed in FIG. 5 so that the roller 15 is moved into the underside of the other end of the second engaging member 12 so as to lift the other end of the second engaging member 12 upward, whereby the second engaging teeth 13 formed on the upper edge of the other end of the second engaging member 12 are brought into engagement with the first engaging teeth 10 fixed to the underside of the upper steering column 4, whereby the upper steering column section 4 is fixed against rotation about the axis of the horizontal shafts 6, 6.

The steering wheel is therefore held at the adjusted height. When the steering wheel has been set as described, the tensile spring 21 applies an elastic tensile force to the tilt lever 7, tending the tilt lever 7 to pivot clockwise as viewed in FIG. 5, whereby the roller 15 prevented from unintentionally retracting from the space under the second engaging member 12.

In the described tiltable steering device, the first engaging member 9 is fixed to the underside of the upper steering column section 4, while the second engaging member 12 is pivotably connected to the support bracket 5. This arrangement, however, may be altered such that the first engaging member 9 is fixed to the underside of the support bracket 5, while the second engaging member 12 is pivotably connected to the upper steering column section 4, as shown in FIG. 8.

In the known tiltable steering device constructed and used in the manner described, the connecting mechanism inevitably projects in a large amount from the underside of the steering column 2, because of the presence of the roller 15 under the second engaging member 12. Consequently, problems are encountered such as degradation of the appearance or interference with the driver's knee.

SUMMARY OF THE INVENTION

Accordingly, an object of the present invention is to provide a tiltable steering device having an improved appearance and free from the problem of interference with the driver's body.

The tiltable steering device of the present invention has, as in the case of the known device described before, a support bracket fixed to a vehicle body, a steering column having one end pivotably secured to the support bracket by means of first horizontal shafts, a first engaging member fixed to the underside of the steering column and having a lower surface projecting downward in an arcuate form centered at the axis of the first horizontal shafts and having first engaging teeth formed on the downwardly projecting lower surface thereof, a second engaging member pivotably supported at its one end on a second horizontal shaft provided on the support bracket and provided with second engaging teeth provided on the upper edge of the other end thereof and engageable with the first engaging teeth, and a hanger plate pivotable to cause the first and second engaging teeth to be brought into and out of engagement with each other and having a slot formed in one end thereof. According to the invention, the other end of the second engaging member and an intermediate portion of the hanger plate are pivotably supported by a third horizontal shaft, and a guide member projecting from one side of the support bracket is loosely received in the slot formed in the hanger plate, the slot having a form which does not conform with an arc centered at the third horizontal shaft.

When the height of the steering wheel is to be adjusted in accordance with, for example, the size of the driver's body, the hanger plate is made to pivot about the axis of the third horizontal shaft. Since the slot having a configuration which does not coincide with the arc centered at the third horizontal axis is formed in the end of the hanger plate, the distance between the guide member and the third horizontal shaft is changed in accordance with the pivoting of the hanger plate about the axis of the third shaft, so that the second engaging member pivotably supported at its other end by the third horizontal axis pivots about the center of the second horizontal axis, whereby the second engaging teeth formed on the upper edge of the other end of the second engaging member are brought into and out of engagement with the first engaging teeth on the underside of the first engaging member.

The tiltable steering device of the present invention is similar to the known device in that the adjustment of the height of the steering wheel and fixing of the steering wheel at the adjusted position are allowed by selective engagement between the first engaging teeth on the first engaging member and the second engaging teeth on the second engaging member. According to the present invention, however, the amount of downward projection of the connecting mechanism can be diminished by virtue of elimination of the necessity for provision of a shaft and a roller in the space under the second engaging member.

DESCRIPTION OF THE PREFERRED EMBODIMENTS

Figure 1:
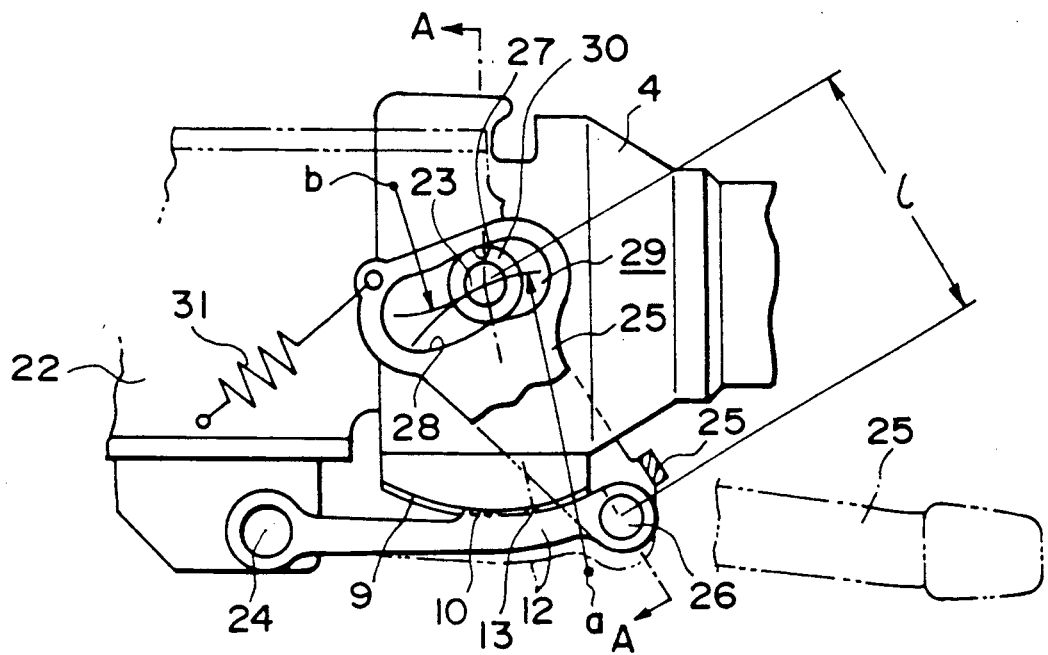
FIG. 1 is a side elevational view of a critical portion of a first embodiment.
Figure 2:
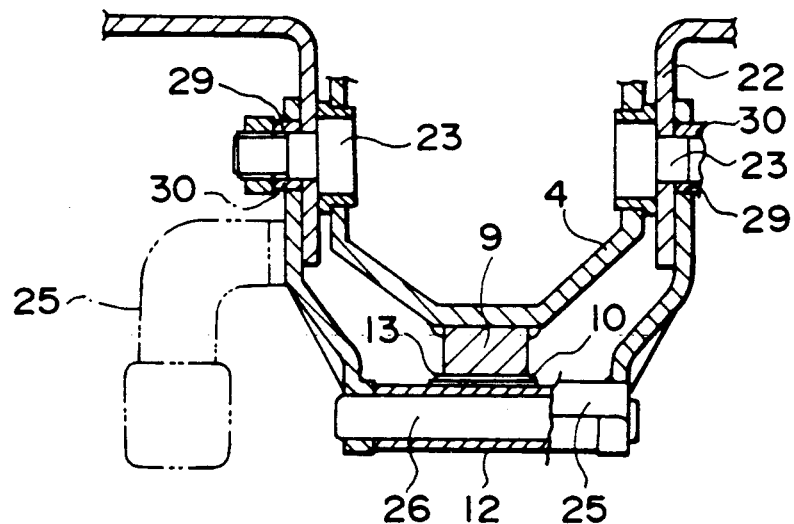
FIG. 2 is a sectional view taken along the line A—A of FIG. 1.

FIG. 1 is a side elevational view of a critical portion of a first embodiment of the tiltable steering device of the present invention, while FIG. 2 is a sectional view taken along the line A—A of FIG. 1.

Numeral 4 denotes an upper steering column section 4 which is pivotably connected at its one end to a support bracket 22 by means of a pair of first horizontal shafts 23, 23 projecting from both sides of the support bracket 22.

A first engaging member 9 is fixed to the underside of the upper steering column section 4. The lower surface of the first engaging member is projected in an arcuate form centered at the axis of the first horizontal shafts 23 and 23, and first engaging teeth 10 are formed on the downwardly projected lower surface of the first engaging member 9.

A second horizontal shaft 24 is provided in a portion of the support bracket 22 which is on the front lower side (left lower side as viewed in FIG. 1) of the first horizontal shafts 23, 23. A second engaging member 12 is pivotably connected at its one end to the second horizontal shaft 24. Second engaging teeth 13 engageable with the first engaging teeth 10 on the lower side of the first engaging member 9 are formed on the upper edge of the other end of the second engaging member 12. The first and second engaging teeth 10 and 13 are adapted to be selectively brought into and out of engagement with each other by means of a hanger plate 25 which will be described later.

In the tiltable steering device of the present invention, the other end of the second engaging member 12 is supported by a third horizontal shaft 26 which also supports a mid portion of the hanger plate 25 for bringing the first and second engaging teeth 10 and 13 into and out of engagement with each other.

The hanger plate 25 has a bifurcated form with each end thereof being provided with a slot 29. Each slot 29 has a form composed of two arcuate portions: namely, a first arcuate portion 27 centered at a first point a forwardly and downwardly offset from the third horizontal shaft 26 and a second arcuate portion 28 centered at a second point b which is on the side opposite to the third horizontal shaft 26. Sliding sleeves 30, 30 as guide members loosely fit on intermediate portions of the respective first horizontal shafts 23, 23.

A tension spring 31 is loaded between the hanger plate 25 having the described construction and the support bracket 22. The arrangement is such that the sliding sleeves 30, 30 are held on the ends of the first arcuate portions 27 of the slots 29, 29, unless an external force is exerted to urge the hanger plate 25 in the counterclockwise direction as viewed in FIG. 1.

When the height of the steering wheel is to be adjusted in the tiltable steering device of the invention in accordance with, for example, the size of the driver's body, the hanger plate 25 is made to pivot around the third horizontal shaft 26 in the clockwise direction as viewed in FIG. 1.

Since the slot 29 composed of first and second arcuate portions 27 and 28 is formed in each end of the bifurcated hanger pate 25, the distance l between the sliding sleeves 30, 30 and the third shaft 26 is progressively increased as the hanger plate 25 is made to pivot clockwise as viewed in FIG. 1 about the axis of the third horizontal shaft 26.

Thus, the distance ( between the sliding sleeves 30, 30 as the guide member and the third horizontal shaft 26 is progressively increased, so that the second engaging member 12 which is supported at its other end by the third horizontal axis 26 is made to pivot about the second horizontal shaft 24, whereby the second engaging teeth 13 formed on the upper edge of the other end of the second engaging member 12 are disengaged from the first engaging teeth provided on the lower side of the first engaging member 9 fixed to the lower surface of the upper steering column section 4.

In the illustrated embodiment, since the slots 29 have second arcuate portions 28 which are on the opposite side to the third horizontal shaft 26, the distance l between the sliding sleeves 30, 30 as the guide member and the third horizontal shaft 26 is remarkably increased to ensure that the engagement between the first engaging teeth 10 and the second engaging teeth 13 is dismissed.

After the height of the steering wheel is adjusted after disengagement of the second engaging teeth 13 from the first engaging teeth 10, the hanger plate 25 is made to pivot in the counter-clockwise direction so as to shorten the distance l between the sliding sleeves 30, 30 as the guide member and the third horizontal shaft 26, whereby the other end of the second engaging member 12 is raised to bring the first engaging teeth 10 on the underside of the first engaging member 9 fixed to the lower side of the upper steering column section 4 and the second engaging teeth 12 on the upper edge of the other end of the second engaging member, thus fixing the upper steering column 4 against rotation about the axis of the first horizontal shafts 23, 23.

Consequently, the steering wheel is held at the adjusted height. In this state, the hanger plate 25 is resiliently urged counter-clockwise as viewed in FIG. 1 by the force of the tensile spring 31, whereby unintentional disengagement between the first and second engaging the 10 and 13 is avoided.

In the illustrated embodiment, since each slot 29 is provided at its one end with a first arcuate portion 27 centered at the first point a which is comparatively close to the third horizontal shaft 26, the force with which the second engaging teeth 13 are pressed onto the first engaging teeth 10 is progressively increased by the wedging action as the hanger plate 25 pivots, whereby any shake and rattle of the upper steering column section 4 is prevented.

The arrangement may be such that a pin provided on the lever rotatable about the horizontal shaft 23 is inserted into a hole provided in the hanger plate 25 so that the rotation of the hanger pate is caused by operation of the lever.

Figure 5:
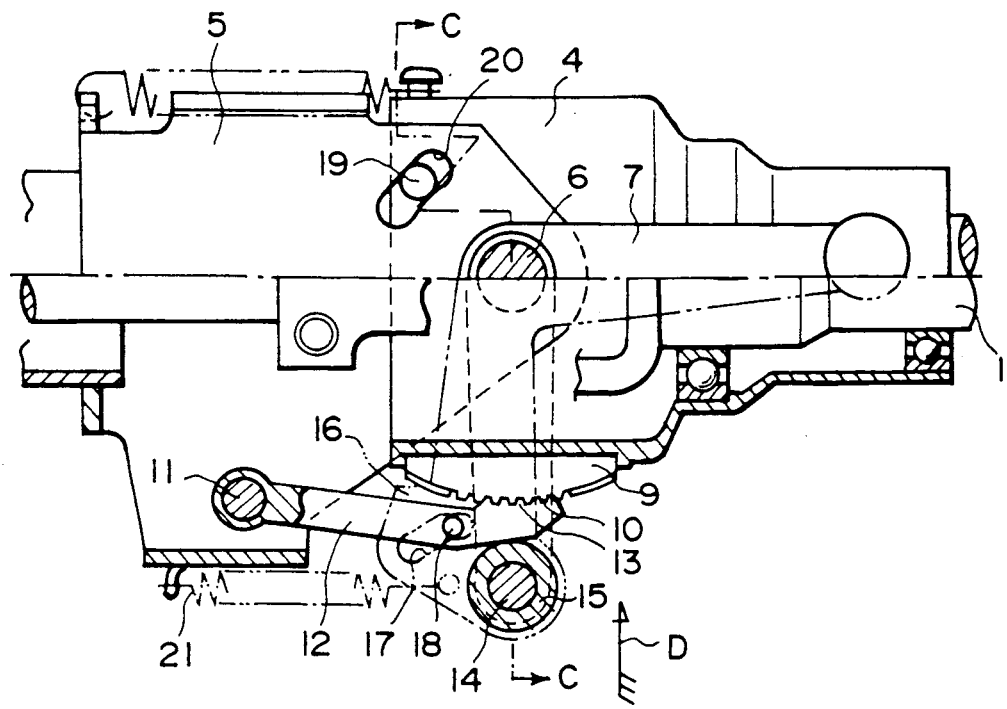
FIG. 5 is a partly-sectioned side elevational view of the known tiltable steering device, particularly a portion marked at B in FIG. 4.
Figure 6:
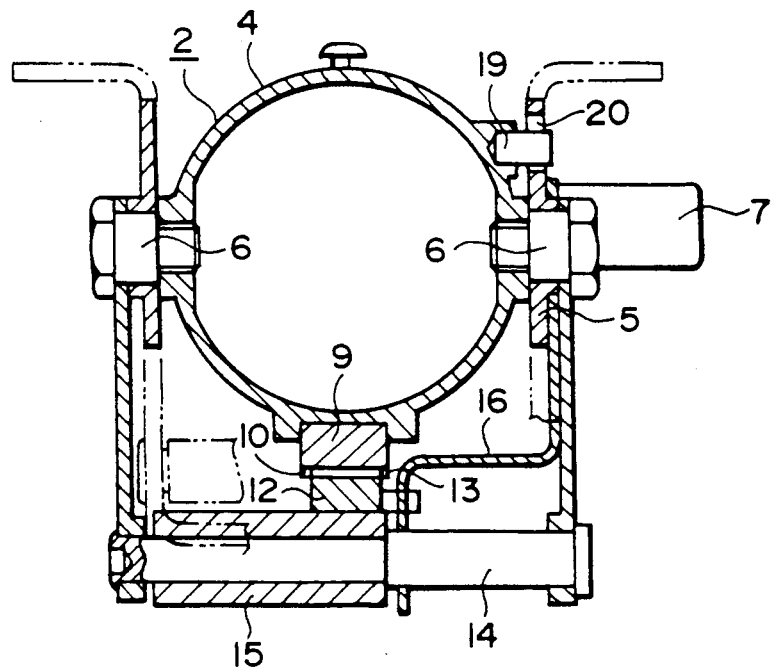
FIG. 6 is a sectional view taken along the line C—C of FIG. 5.
Figure 7:
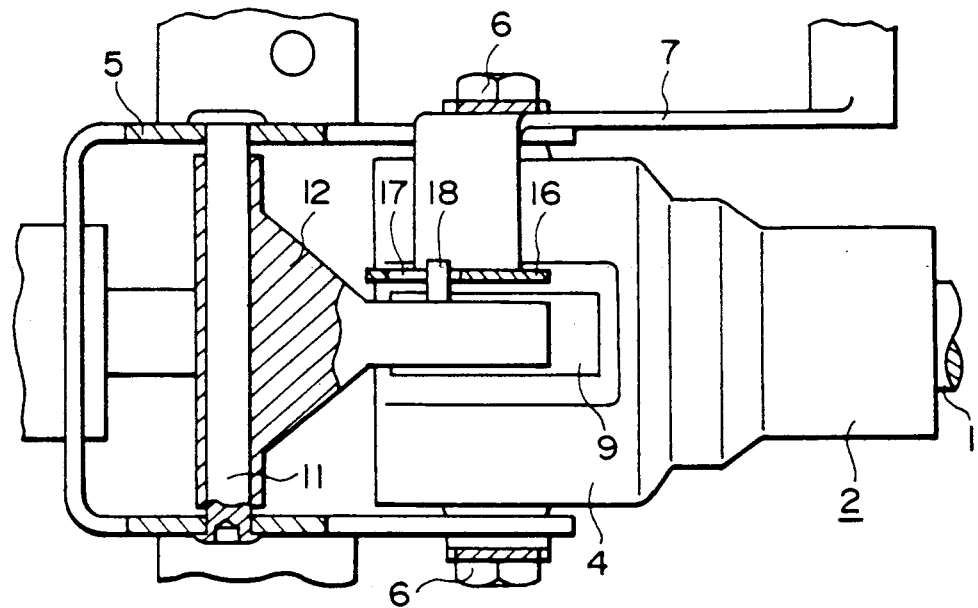
FIG. 7 is an illustration of the portion of the known device shown in FIG. 5 as viewed in the direction of an arrow D.
Figure 8:
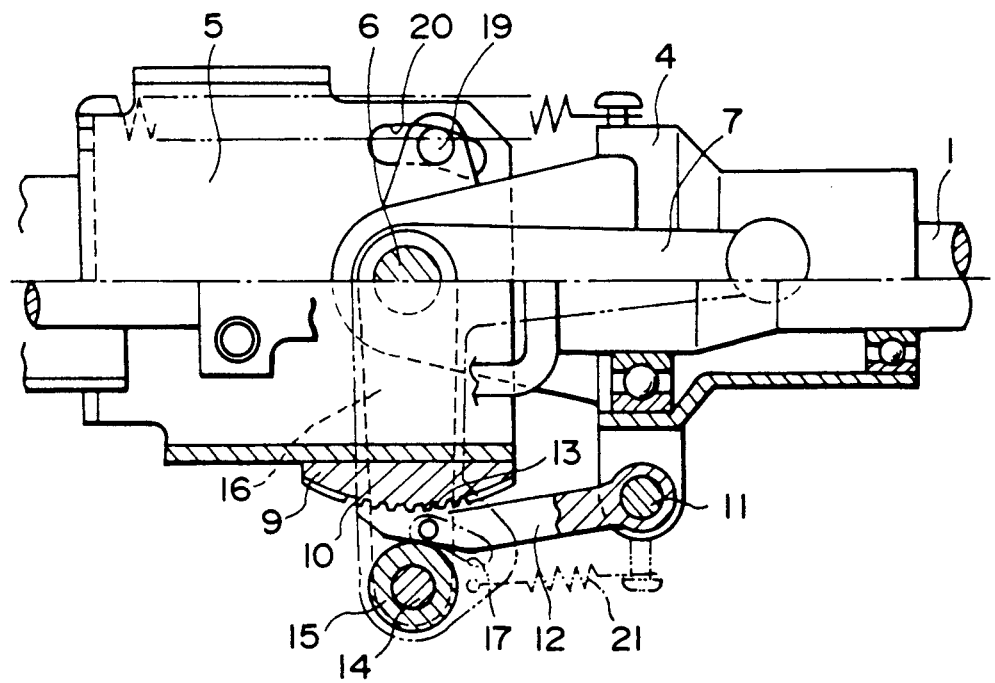
FIG. 8 is a partly-sectioned side elevational view of another tiltable steering device shown in FIG. 8.

The tiltable steering device of the present invention is similar to the known device in that the adjustment of the height of the steering wheel and fixing of the steering wheel at the adjusted position are allowed by selective engagement between the first engaging teeth 10 on the first engaging member 9 and the second engaging teeth 13 on the second engaging member 10. According to the present invention, however, the amount of downward projection of the connecting mechanism from the steering column 2 can be diminished by virtue of elimination of the necessity for provision of a shaft 14 and a roller 15 (see FIGS. 5 and 6) which are disposed in the space under the second engaging member 12.

Figure 3:
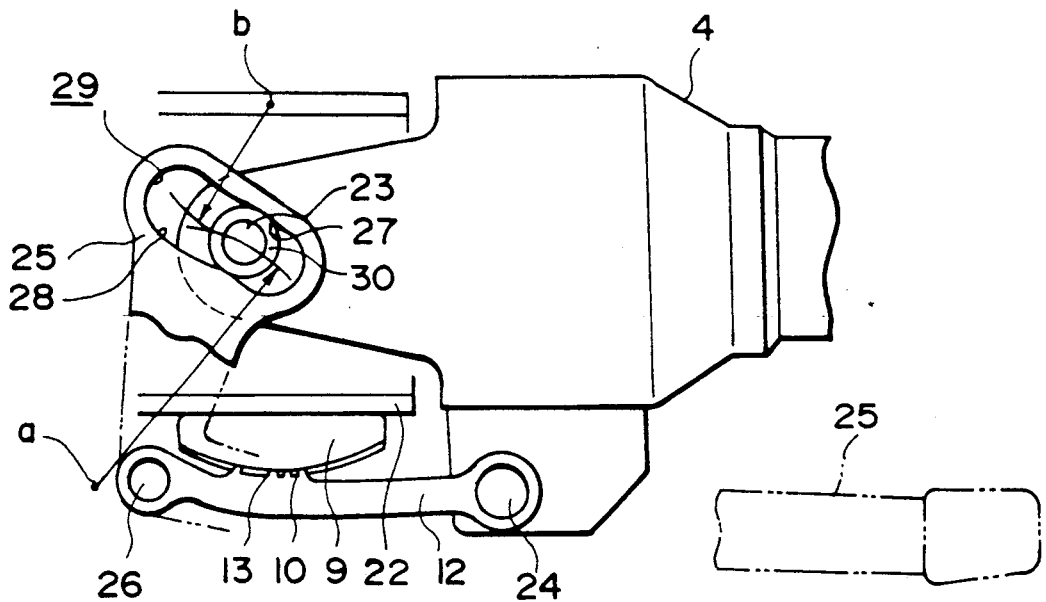
FIG. 3 is a side elevational view of a critical portion of a second embodiment.
Figure 4:
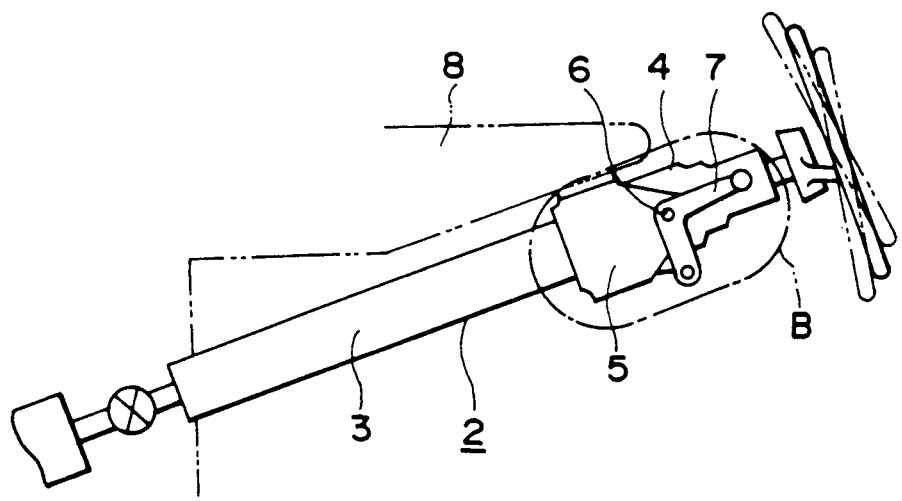
FIG. 4 is a side elevational view of a known tiltable steering device.

In the first embodiment as described, the first engaging member 9 is fixed to the underside of the upper steering column section 4 while the second horizontal shaft 24 for pivotably supporting the end of the second engaging member 12 is provided on the support bracket 22. This, however, is not exclusive and the arrangement may be such that first engaging member 9 is fixed to the underside of the support bracket 22 while the second horizontal shaft 24 is provided on the upper steering column section 4, as in a second embodiment which is shown in FIG. 3. The operation of the second embodiment is not described in this specification because it is materially the same as the first embodiment.

The tiltable steering device of the present invention has the described construction and operates in the described manner. Since the amount of downward projection of the connecting mechanism is diminished, the degradation of appearance can be diminished and, so as not to impair the appearance of the portion at which the device is secured to the fixed part of the automobile, while reducing chance of interference between the driver's knee and the tiltable steering device.

I claim:

1. A tiltable steering device comprising: a support bracket fixed to a vehicle body; a steering column having one end pivotably secured to said support bracket by means of first horizontal shafts; a first engaging member fixed to the underside of said steering column and having a lower surface projecting downward in an arcuate form centered at the axis of the first horizontal shafts and having first engaging teeth formed on the downwardly projecting lower surface thereof; a second engaging member pivotably supported at its one end on a second horizontal shaft provided on said support bracket and provided with second engaging teeth provided on the upper edge of the other end thereof and engageable with said first engaging teeth; a hanger plate pivotable to cause said first and second engaging teeth to be brought into and out of engagement with each other and having a slot formed in one end thereof; a third horizontal shaft pivotably supporting the other end of said second engaging member and an intermediate portion of said hanger plate; and a guide member projecting from one side of said support bracket and loosely received in said slot formed in said hanger plate, said slot having a form which does not conform with an arc centered at the third horizontal shaft.

2. A tiltable steering device according to claim 1, wherein said slot has a form composed of a first arcuate portion centered at a first point laterally spaced from said third shaft and a second arcuate portion connected to the first arcuate portion and centered at a second point which is located on the side opposite to the third shaft, for the first horizontal shafts.

3. A tiltable steering device comprising: a support bracket fixed to a vehicle body; a steering column having one end pivotably secured to said support bracket by means of first horizontal shafts; a first engaging member fixed to the underside of said support bracket and having a lower surface projecting downward in an arcuate form centered at the axis of the first horizontal shafts and having first engaging teeth formed on the downwardly projecting lower surface thereof; a second engaging member pivotably supported at its one end on a second horizontal shaft provided on said steering column and provided with second engaging teeth provided on the upper edge of the other end thereof and engageable with said first engaging teeth; a hanger plate pivotable to cause said first and second engaging teeth to be brought into and out of engagement with each other and having a slot formed in one end thereof; a third horizontal shaft pivotably supporting the other end of said second engaging member and an intermediate portion of said hanger plate; and a guide member projecting from one side of said support bracket and loosely received in said slot formed in said hanger plate, said slot having a form which does not conform with an arc centered at the third horizontal shaft.

4. A tiltable steering device according to claim 1, wherein said slot has a form composed of a first arcuate portion centered at a first point laterally spaced from said third shaft and a second arcuate portion connected to the first arcuate portion and centered at a second point which is located on the side opposite to the third shaft, for the first horizontal shafts.

* * * * *